United States Patent
Tamagawa et al.

[11] Patent Number: 5,887,087
[45] Date of Patent: Mar. 23, 1999

[54] IMAGE READING APPARATUS

[75] Inventors: Kiyomi Tamagawa; Shin-ichi Ichikawa, both of Kanagawa-ken, Japan

[73] Assignee: Fuji Photo Film Co., Ltd, Kanagawa-ken, Japan

[21] Appl. No.: 839,133

[22] Filed: Apr. 23, 1997

Related U.S. Application Data

[63] Continuation of Ser. No. 409,585, Mar. 24, 1995, abandoned.

[30] Foreign Application Priority Data

Apr. 13, 1994 [JP] Japan .................................. 6-075127

[51] Int. Cl.$^6$ ...................................................... G06K 7/00
[52] U.S. Cl. ............................................ 382/312; 348/219
[58] Field of Search ................................... 382/162, 312, 382/322; 348/219, 230, 266; 358/474

[56] References Cited

U.S. PATENT DOCUMENTS

| | | | |
|---|---|---|---|
| 4,581,649 | 4/1986 | Morokawa | 348/219 |
| 4,607,287 | 8/1986 | Endo et al. | 348/219 |
| 4,992,878 | 2/1991 | Hersh | 348/219 |
| 4,998,164 | 3/1991 | Endo et al. | 348/219 |
| 5,063,450 | 11/1991 | Pritchard | 348/219 |

FOREIGN PATENT DOCUMENTS 3236687 10/1991 Japan .......................... H04N 5/225

Primary Examiner—Christopher S. Kelley
Attorney, Agent, or Firm—Sughrue, Mion, Zinn, Macpeak & Seas, PLLC

[57] ABSTRACT

CCD line sensors for detecting R, G, B colors are displaced by a piezoelectric element in a direction in which the CCD line sensors are arrayed, for repeatedly reading an image on one scanning line a plurality of times. Each time the image is read, pixel signals produced by the photoelectric transducers of the CCD line sensors are combined in a given sequence through selector switches, and stored as a series of data in line buffers associated with the colors. Two line buffers are associated with each of the colors. While one of the line buffers is in the process of storing pixel signals, the pixel signals stored in the other line buffer are read and processed into an image signal. The resolution of the image signal is increased without increasing the number of the photoelectric transducers and using a relatively small memory capacity.

5 Claims, 10 Drawing Sheets

IMAGE READING APPARATUS

This is a Continuation of application Ser. No. 08/409,585 filed Mar. 24, 1995 now abandoned.

BACKGROUND OF THE INVENTION

1. Field of the Invention

The present invention relates to an image reading apparatus for two-dimensionally reading an image with line sensors, and more particularly to an image reading apparatus whose resolution has been increased without increasing the number of photoelectric transducers of line sensors.

2. Description of the Related Art

There have widely been used image reading apparatuses including photomultipliers or charge-coupled devices (CCDs) for reading an image on a document to generate an image signal. Since the image reading apparatuses divide an image into a finite number of pixels and read image information from the pixels, there is a certain limitation on the spatial frequencies of images that can be reproduced from image information read by the image reading apparatus.

If an image is read using a photomultiplier, then it is possible to increase the resolution of the read image by increasing the frequency of a synchronizing signal used in the reading process.

If an image is read using a CCD, however, then since the number of pixels of a produced image signal is limited by the number of the photoelectric transducers included in the CCD and also since the area of the photosensitive section of the CCD is limited depending on the areas of the photoelectric transducers, the resolution of the CCD is lower than the photomultiplier. Specifically, the spatial frequency of an image that can be reproduced by a CCD is ½P (Nyquist frequency) where P is the distance between the centers of photoelectric transducers, and any spatial frequencies higher than ½P give rise to noise.

When images having a spatial frequency in the vicinity of ½P are read by a CCD, the CCD responds largely differently depending on the phase of the images with respect to the photoelectric transducers even if the images are the same as each other. For example, as shown in FIG. 12 of the accompanying drawings, when identical sinusoidal images A, B which are 90° out of phase with each other with respect to photoelectric transducers P1, P2, ... of a CCD are read by the CCD, an image signal generated by the CCD is not representative of the images A, B because the images applied to each of the photoelectric transducers P1, P2, ... are averaged. FIG. 13 of the accompanying drawings shows the relationship between the spatial frequency and the CCD response at the time the CCD reads identical sinusoidal images that are 20° out of phase with each other. FIG. 13 indicates that the CCD response with respect to the phase differs largely as the spatial frequency is higher. An image reading apparatus known as a scanner for producing film plates for use in printing outputs images at high magnification ratios. In such an image reading apparatus, images having higher spatial frequencies are largely affected by response differences due to phase differences, and such response differences appear as moiré patterns, for example, in the outputted images.

Japanese laid-open patent publication No. 3-236687 discloses an attempt to solve such a problem. According to the disclosed arrangement, a solid-state imaging device composed of an area sensor is displaced in four directions, i.e., upward, downward, leftward, and rightward, and pixel signals generated by the solid-state imaging device in these respective four positions are arranged in a given sequence for thereby increasing the apparent number of pixels of the solid-state imaging device, thereby increasing the resolution.

The solid-state imaging device comprises an area sensor, and pixel signals generated by the solid-state imaging device in respective four positions are stored in respective four image buffers and subsequently need to be combined in an image synthesis memory. Therefore, a considerably large memory capacity is required for these memories. The area sensor suffers a structural limitation which makes it difficult to provide a higher resolution than line sensors. It has been impossible to remove effects which the phase has on the image at higher spatial frequencies in the area sensor.

SUMMARY OF THE INVENTION

It is therefore an object of the present invention to provide an image reading apparatus which does not need a large memory capacity, is capable of easily carrying out a moving average processing on odd- and even-numbered pixel signal from line sensors, and of generating an image signal of desired resolution irrespective of the number of photoelectric transducers of the line sensors.

To achieve the above object, there is provided in accordance with the present invention an image reading apparatus comprising a line sensor composed of an array of photoelectric transducers for producing pixel signals, memory means for storing the pixel signals produced by the photoelectric transducers, processing means for determining a moving average of the pixel signals stored by the memory means, displacing means for displacing the line sensor in a direction along the array of photoelectric transducers to successive positions each by an interval M expressed by:

$$M = 2P/(2k+1)$$

where P is the distance between the centers of adjacent two of the photoelectric transducers and k is an integer of at least 1, and pixel signal combining means for combining the pixel signals produced by the photoelectric transducers when the line sensor is in an original position and displaced from the original position to the successive positions, in a predetermined sequence, and storing the combined pixel signals as a series of data in the memory means.

The memory means may comprise a line buffer for storing as many pixel signals as (2k+1) times the number of the photoelectric transducers.

In the image reading apparatus, the line sensor reads an image when it is in the original position, and stores produced pixel signals in the memory means. Then, the line sensor is displaced successively by the interval M along the array of photoelectric transducers. Each time the line sensor is displaced, it reads the image on the same scanning line, and stores produced pixel signals in the memory means. Such a process is repeated 2k times. Therefore, the image is read in slightly different positions on the same scanning line repeatedly (2k+1) times.

The pixel signals read by the line sensor when it is in the original position and the successive positions displaced therefrom are combined into a predetermined sequence by the pixel signal combining means, and stored as a series of data in the memory means. The pixel signals thus stored in the memory means are subjected to a moving average processing to produce an image signal that is composed of as many moving average pixel signals as (2k+1) times the number of the photoelectric transducers of the line sensor.

Consequently, the image signal produced by the image reading apparatus has a resolution (2k+1) times larger than that of an image signal which would otherwise be produced if an image were read by a CCD line sensor fixed against displacement. Since the resolution is (2k+1) times larger, the spatial frequency that can be reproduced is also (2k+1) times higher. Therefore, an image can be reproduced from the image signal without being affected by the phase of the original image.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
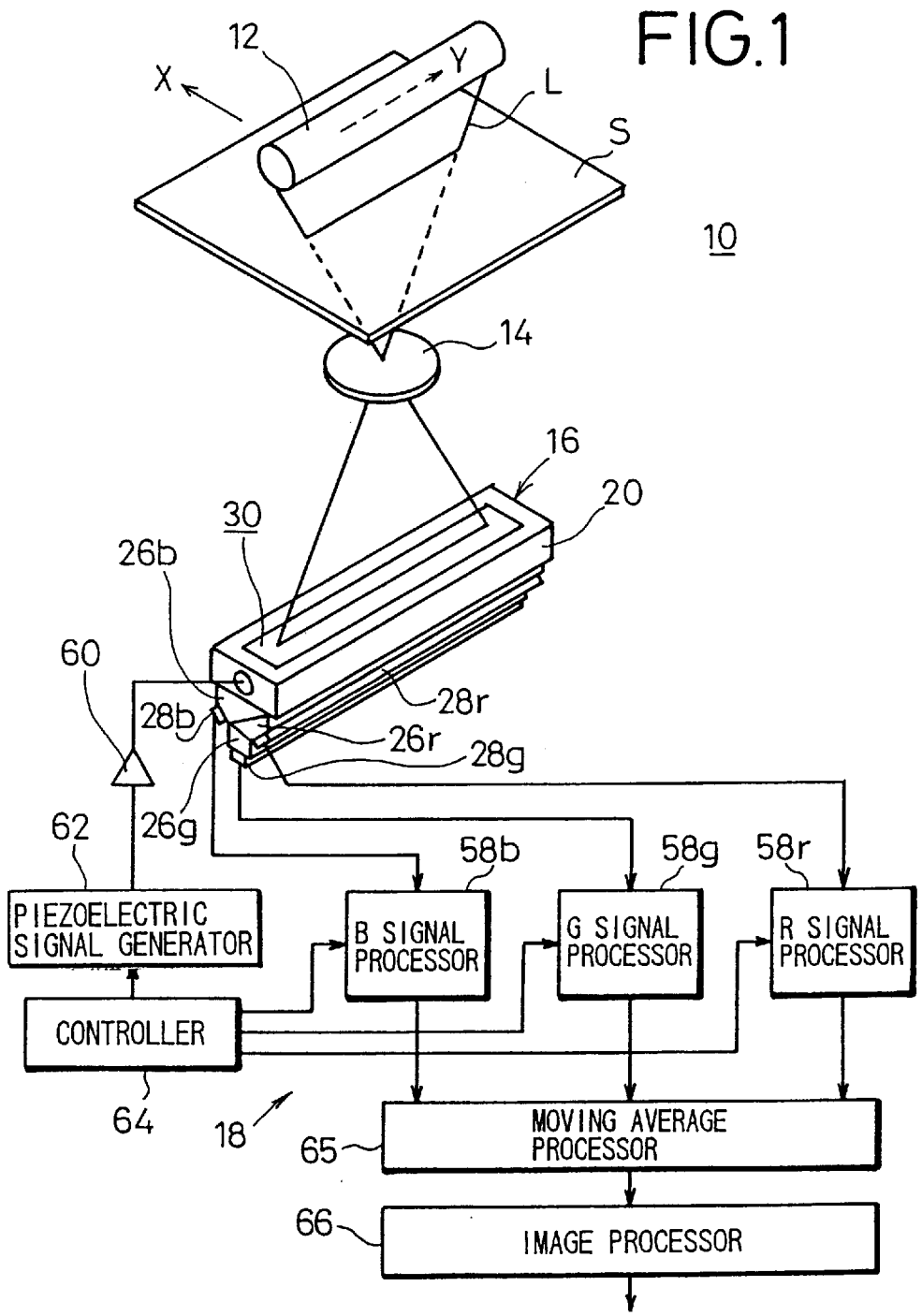
FIG. 1 is a block diagram, partly in perspective, of an image reading apparatus according to the present invention.
Figure 2:
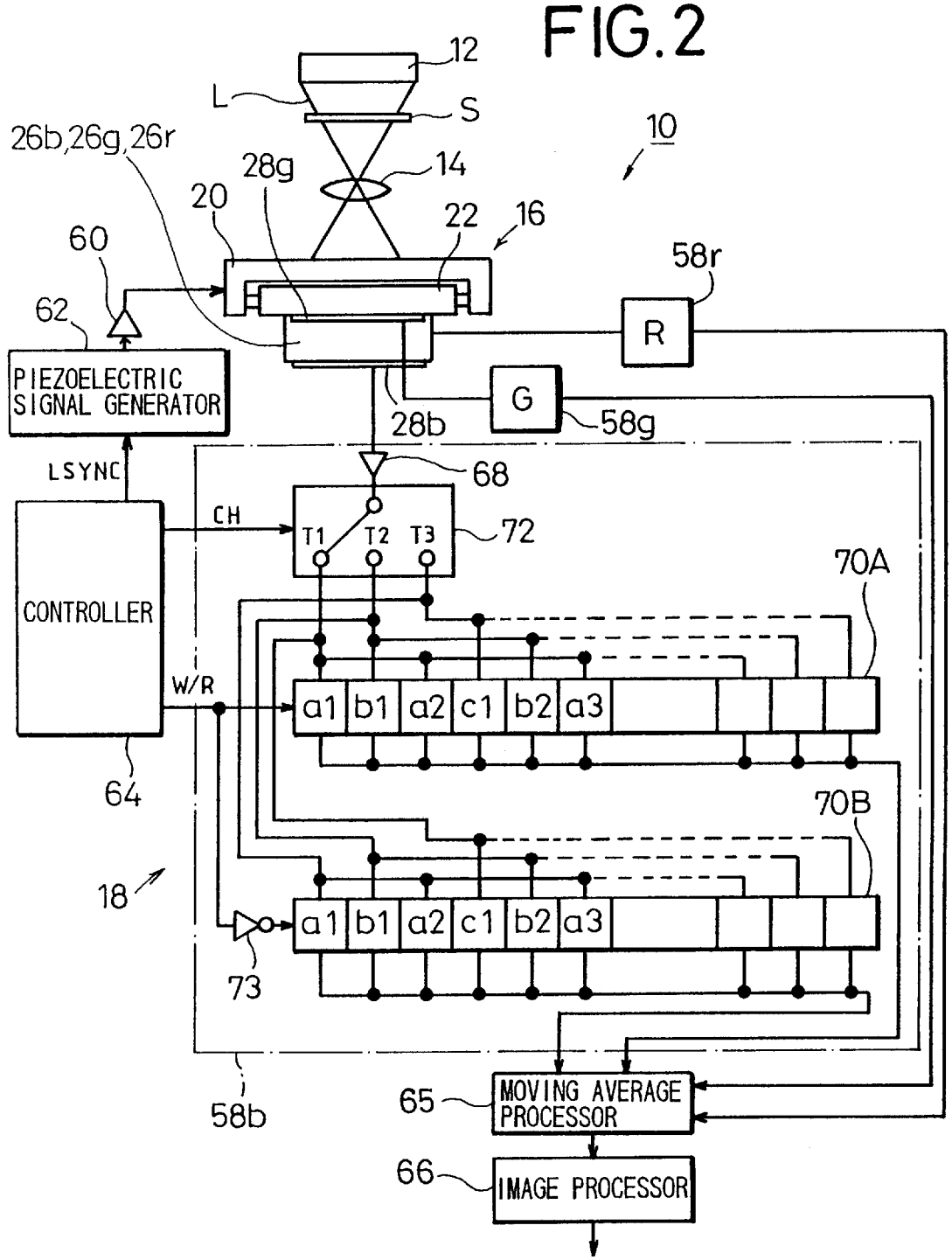
FIG. 2 is a block diagram, partly in elevation, of the image reading apparatus.

As shown in FIGS. 1 and 2, an image reading apparatus 10 according to the present invention generally comprises an illuminating light source 12 for illuminating a subject S in a main scanning direction indicated by the arrow Y while the document S is being fed in an auxiliary scanning direction indicated by the arrow X, a condensing lens 14 for concentrating illuminating light L that has passed through the subject S, a transducer assembly 16 for converting the illuminating light L concentrated by the condensing lens 14 into an electric signal, and a signal processor 18 for processing the electric signal from the transducer assembly 16.

Figure 3:
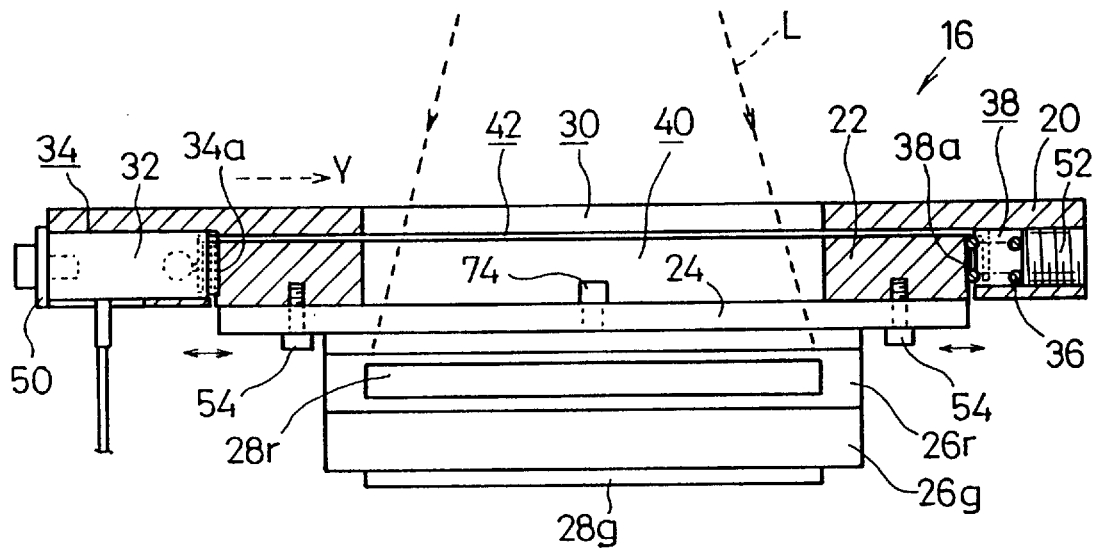
FIG. 3 is a cross-sectional view of a transducer assembly of the image reading apparatus.
Figure 4:
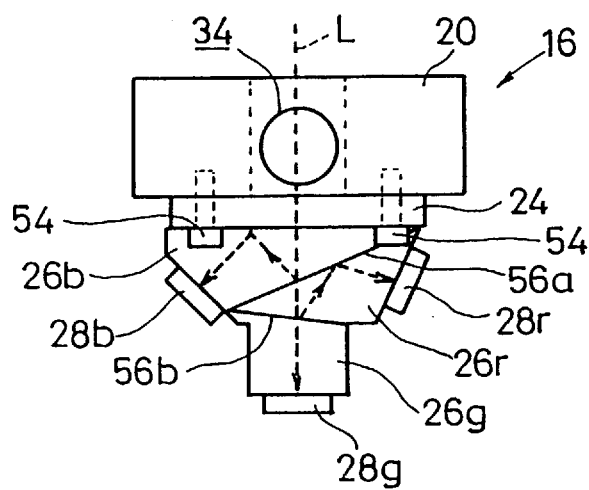
FIG. 4 a side elevational view of the transducer assembly of the image reading apparatus.

As shown in FIGS. 3 and 4, the transducer assembly 16 comprises a support base 20 elongate in the main scanning direction Y, an oscillatory base 22 supported by the support base 20 for oscillating movement in the main scanning direction Y with respect to the support base 20, a plurality of stacked prisms 26b, 26g, 26r fixed to the oscillatory base 22 by a bracket 24, and a plurality of CCD line sensors 28b, 28g, 28r fixed respectively to the prisms 26b, 26g, 26r.

The support base 20 has an elongate opening 30 defined centrally therein for passing the illuminating light L therethrough to the CCD line sensors 28b, 28g, 28r, a hole 34 defined in one end thereof and receiving a piezoelectric element 32 that serves as a displacing means, and a hole 38 defined in the opposite end thereof and receiving a coil spring 36.

Figure 5:
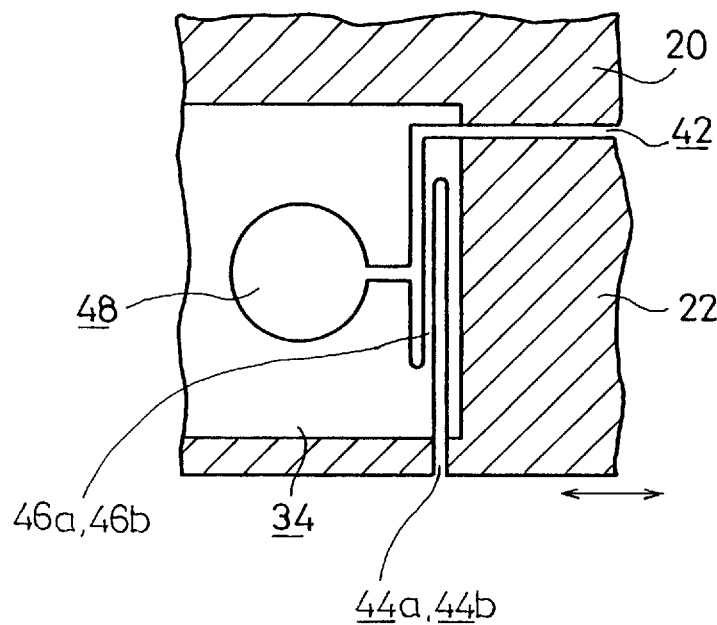
FIG. 5 is an enlarged fragmentary cross-sectional view of the transducer assembly shown in FIG. 3.

The oscillatory base 22 has an elongate opening 40 defined centrally therein in substantial alignment with the opening 30 in the support base 20, and has opposite ends positioned at respective inner ends 34a, 38a of the holes 34, 38 in the support base 20. The support base 20 and the oscillatory base 22 are integral with each other, but essentially separate from each other by a slit 42 (see also FIG. 5) which extends in the main scanning direction Y and has opposite ends bent in the direction normal to the main scanning direction Y, i.e., in the direction in which the prisms 26b, 26g, 26r are stacked. As shown in FIG. 5, the support base 20 has slits 44a, 44b defined therein closely and parallel to the bent ends of the slit 42 between the bent ends of the slit 42 and the opposite ends of the oscillatory base 22, leaving thin walls 46a, 46b between the bent ends of the slit 42 and the slits 44a, 44b. The slits 44a, 44b extend from the stacked prisms 26b, 26g, 26r toward the slit 42, but terminates short of the slit 42. As a consequence, the oscillatory base 22 is allowed by the thin walls 46a, 46b to be displaced in the main scanning direction Y with respect to the support base 20.

The slit 42 communicates with a hole 48 which is defined in one end of the support base 20 for passing therethrough a wire (not shown) for cutting the slit 42 with a wire-cutting electric discharge machine.

The piezoelectric element 32 is mounted in the hole 34 in the support base 20 by a fixing plate 50, and has an end held against the inner end 34a of the hole 34. The coil spring 36 is mounted in the hole 38 in the support base 20 by a screw 52, and has an end held against the inner end 38a of the hole 38.

As shown in FIGS. 3 and 4, the bracket 24 is fastened to the oscillatory base 22 by screws 54. As shown in FIG. 4, the prisms 26b, 26g, 26r are joined to each other through dichroic filters 56a, 56b interposed therebetween. The dichroic filters 56a, 56b serve to separate the illuminating light L into lights B, G, R of different wavelengths and guide the lights B (blue), G (green), R (red) respectively to the CCD line sensors 28b, 28g, 28r. The CCD line sensors 28b, 28g, 28r serve to photoelectrically convert the lights B, G, R into corresponding electric signals B, G, R.

As shown in FIG. 1, the signal processor 18 comprises a B signal processor 58b for processing the B signal from the CCD line sensor 28b, a G signal processor 58g for processing the G signal from the CCD line sensor 28g, a R signal processor 58r for processing the R signal from the CCD line sensor 28r, a piezoelectric signal generator 62 for supplying a drive signal through an amplifier 60 to the piezoelectric element 32, a controller 64 for supplying control signals to the B signal processor 58b, the G signal processor 58g, the R signal processor 58r, and the piezoelectric signal generator 62, a moving average processor 65 for effecting a moving average processing on image signals from the B signal processor 58*b*, the G signal processor 58*g*, the R signal processor 58*r* with respect to pixel signals from odd- and even-numbered photoelectric transducers of the CCD line sensors 28*b*, 28*g*, 28*r*, and an image processor 66 for effecting a desired image processing on the pixel signals from the moving average processor 65.

As shown in FIG. 2, the B signal processor 58*b* comprises an amplifier 68 for amplifying the pixel signals from the CCD line sensor 28*b*, two line buffers 70A, 70B each having memory areas that are three times the photoelectric transducers of the CCD line sensor 28*b*, and a selector switch 72 for selecting the memory areas of the line buffers 70A, 70B. The controller 64 is connected directly to the line buffer 70A, and through an inverter 73 to the line buffer 70B. Each of the G signal processor 58*g* and the R signal processor 58*r* is also of the same structure as the B signal processor 58*b*.

Figure 6:
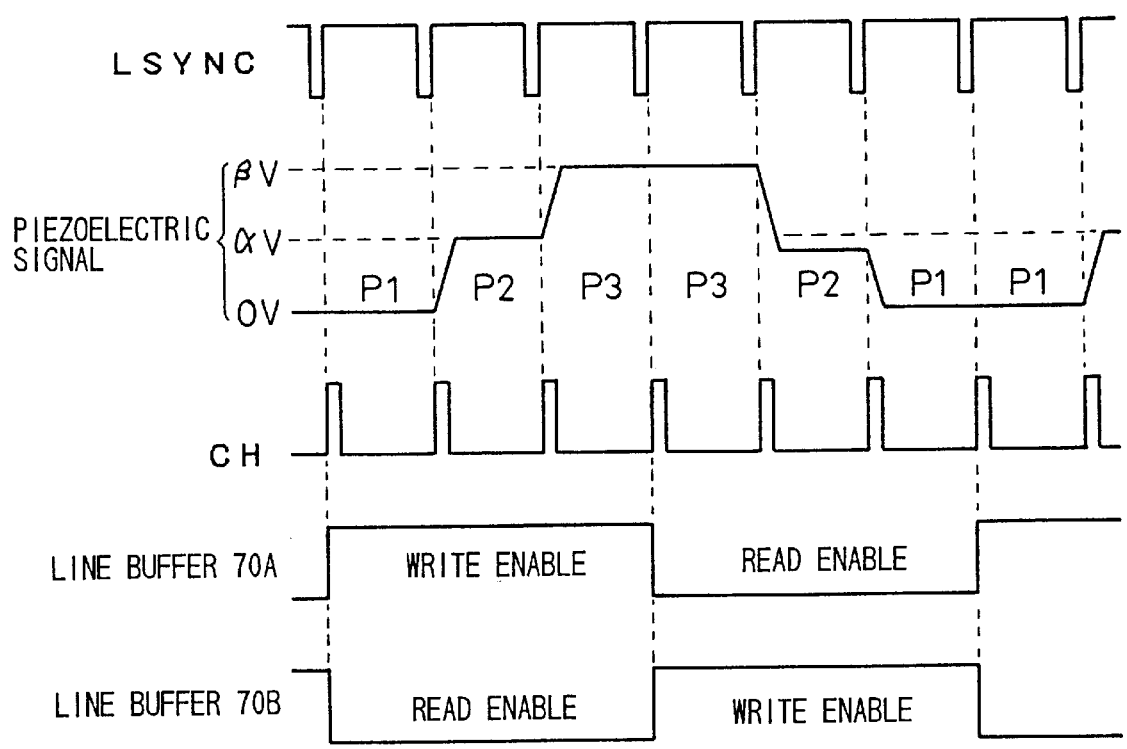
FIG. 6 is a timing chart of a signal processing sequence of the image reading apparatus.

Operation of the image reading apparatus 10 will be described below with reference to FIG. 6.

A subject S with an image recorded thereon is fed in the auxiliary scanning direction X and illuminated by the illuminating light L from the illuminating light source 12 in the main scanning direction Y, so that the subject S is two-dimensionally scanned. The illuminating light L that has passed through the subject S is concentrated by the condensing lens 14, and then separated by the prisms 26*b*, 26*g*, 26*r* and the dichroic filters 56*a*, 56*b* into lights B, G, R, which are then applied to the respective CCD line sensors 28*b*, 28*g*, 28*r*.

The controller 64 supplies a line synchronizing signal LSYNC to the piezoelectric signal generator 62 for controlling the transducer assembly 16, and also supplies a selection signal CH and a read/write signal W/R to each of the B signal processor 58*b*, the G signal processor 58*g*, the R signal processor 58*r* for processing image signals.

Specifically, in response to the line synchronizing signal LSYNC from the controller 64, the piezoelectric signal generator 62 supplies a piezoelectric signal P1 of 0 (V) (see FIG. 6) through the amplifier 60 to the piezoelectric element 32. The controller 64 supplies the switching signal CH to the selector switch 72 to connect its terminal T1 to the CCD line buffers 28*b*, 28*g*, 28*r*, and also supplies the read/write signal W/R to the line buffers 70A, 70B of each of the B signal processor 58*b*, the G signal processor 58*g*, the R signal processor 58*r* for placing the line buffer 70A in a WRITE ENABLE state and the line buffer 70B in a READ ENABLE state.

Figure 7:
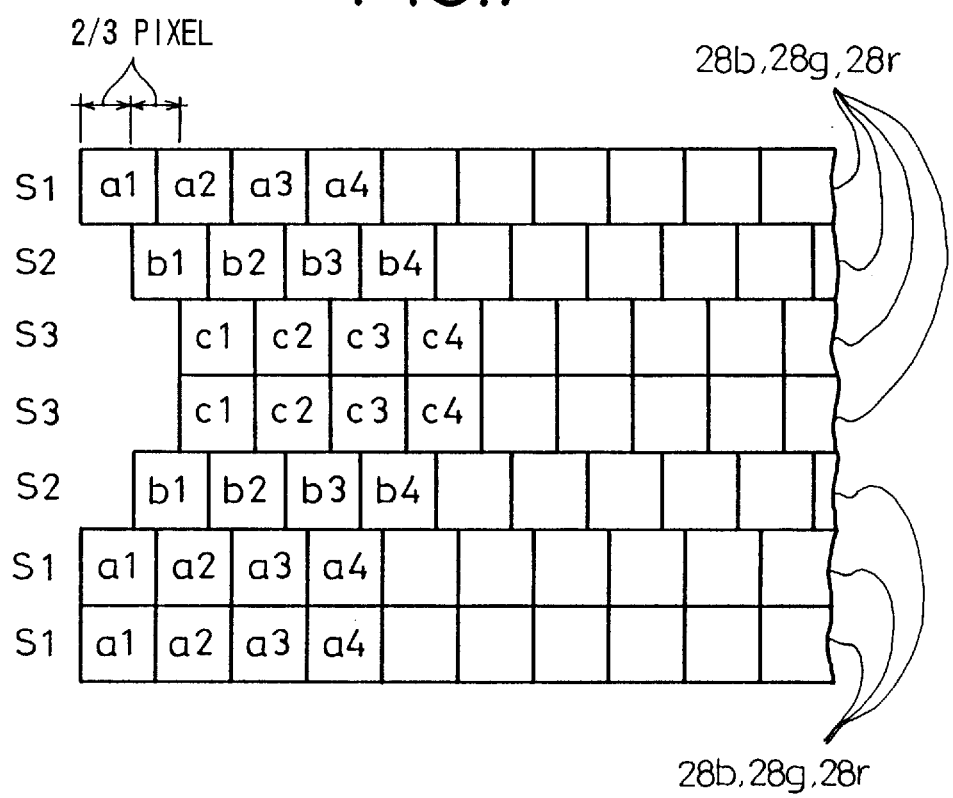
FIG. 7 is a view showing the relationship between displaced positions of CCD line sensors of the image reading apparatus.

Since the piezoelectric signal P1 is of 0 (V) at this time, the oscillatory base 22 positioned between the coil spring 36 and the piezoelectric element 32 is in an initial non-displaced position S1 (see FIG. 7). Pixel signals a1, a2, a3, . . . generated respectively by the photoelectric transducers of the CCD line sensors 28*b*, 28*g*, 28*r* are transfered to the B signal processor 58*b*, the G signal processor 58*g*, the R signal processor 58*r*, respectively, amplified by the amplifiers 68, and stored through the terminals T1 of the selector switches 72 into 1st, 3rd, 6th, 9th, . . . memory areas of the line buffers 70A of the signal processor 58*b*, the G signal processor 58*g*, the R signal processor 58*r* (see FIG. 2).

Then, in response to the line synchronizing signal LSYNC from the controller 64, the piezoelectric signal generator 62 supplies a piezoelectric signal P2 of α (V) (see FIG. 6) through the amplifier 60 to the piezoelectric element 32. The piezoelectric element 32 is now expanded (or contracted) to displace the oscillatory base 22 in the main scanning direction Y by a distance corresponding to a ⅔ pixel interval of the photoelectric transducers of the CCD line sensors 28*b*, 28*g*, 28*r*. The CCD line sensors 28*b*, 28*g*, 28*r* are now in a position S2 (see FIG. 7) which is displaced the ⅔ pixel interval from the initial position S1. At this time, the controller 64 supplies the switching signal CH to the selector switches 72 to connect the terminals T2 to the respective CCD line sensors 28*b*, 28*g*, 28*r*. Pixel signals b1, b2, b3, . . . generated respectively by the photoelectric transducers of the CCD line sensors 28*b*, 28*g*, 28*r* are transfered to the B signal processor 58*b*, the G signal processor 58*g*, the R signal processor 58*r*, respectively, amplified by the amplifiers 68, and stored through the terminals T2 of the selector switches 72 into 2nd, 5th, 8th, . . . memory areas of the line buffers 70A of the signal processor 58*b*, the G signal processor 58*g*, the R signal processor 58*r*.

Thereafter, in response to the line synchronizing signal LSYNC from the controller 64, the piezoelectric signal generator 62 supplies a piezoelectric signal P2 of β (V) (see FIG. 6) through the amplifier 60 to the piezoelectric element 32. The piezoelectric element 32 is further expanded (or contracted) to displace the oscillatory base 22 in the main scanning direction Y by a distance corresponding to a ⅘ pixel interval of the photoelectric transducers of the CCD line sensors 28*b*, 28*g*, 28*r*. The CCD line sensors 28*b*, 28*g*, 28*r* are now in a position S3 (see FIG. 7) which is displaced the ⅘ pixel interval from the initial position S1. At this time, the controller 64 supplies the switching signal CH to the selector switches 72 to connect the terminals T3 to the respective CCD line sensors 28*b*, 28*g*, 28*r*. Pixel signals c1, c2, c3, -generated respectively by the photoelectric transducers of the CCD line sensors 28*b*, 28*g*, 28*r* are transfered to the B signal processor 58*b*, the G signal processor 58*g*, the R signal processor 58*r*, respectively, amplified by the amplifiers 68, and stored through the terminals T3 of the selector switches 72 into 4th, 7th, 10th, . . . memory areas of the line buffers 70A of the signal processor 58*b*, the G signal processor 58*g*, the R signal processor 58*r*.

In the manner described above, the line buffer 70A of each of the signal processor 58*b*, the G signal processor 58*g*, the R signal processor 58*r* successively stores the pixel signals a1, b1, a2, c1, b2, a3, . . . relative to a first scanning line.

Then, the controller 64 supplies the switching signal CH to the selector switches 72 to connect the terminals T1 to the respective CCD line sensors 28*b*, 28*g*, 28*r*, and also supplies the write/read signal W/R to place the line buffers 70A in a READ ENABLE state and the line buffers 70B in a WRITE ENABLE state. As with the line buffers 70A, the controller 64, while controlling the selector switches 72, controls the piezoelectric signal generator 60 to successively apply the piezoelectric signals P3, P2, P1 to store the pixel signals c1, c2, c3, . . . from the CCD line sensors 28*b*, 28*g*, 28*r* set to the position S3, the pixel signals b1, b2, b3, . . . from the CCD line sensors 28*b*, 28*g*, 28*r* set to the position S2, and the pixel signals a1, a2, a3, . . . from the CCD line sensors 28*b*, 28*g*, 28*r* set to the initial position S1 into the line buffer B of each of the signal processor 58*b*, the G signal processor 58*g*, the R signal processor 58*r*. The piezoelectric signal P2 which is generated after the piezoelectric signal P3 is of a voltage lower than the voltage of a (V) in view of the hysteresis of the piezoelectric element 32.

Consequently, the line buffer 70B of each of the signal processor 58*b*, the G signal processor 58*g*, the R signal processor 58*r* successively stores the pixel signals a1, b1, a2, c1, b2, a3, . . . relative to a second scanning line.

While the line buffer 70B is in the process of storing the pixel signals, the moving average processor 65 reads the pixel signals relative to the first scanning line from the line buffer 70A in the READ ENABLE state, and effects a moving average processing on the read pixel signals. Similarly, while the line buffer 70A is in the process of storing the pixel signals, the moving average processor 65 reads the pixel signals relative to the second scanning line from the line buffer 70B in the READ ENABLE state, and effects a moving average processing on the read pixel signals.

The line buffer 70A alternately store, for example, odd-numbered pixel signals (b1, c1, a3, . . . ) and even-numbered signals (a2, b2, . . . ), except the first pixel signal a1, from corresponding one of the photoelectric transducers of the CCD line sensors 28b, 28g, 28r (see FIGS. 2 and 7). At this time, the moving average processor 65 can determine the average of adjacent pixel signals (b1 and a2, a2 and c1, c1 and b2, . . . ) as a moving average signal. As a result, the moving average processor 65 can produce a moving average signal representing smoothed-out odd- and even-numbered pixel signals from the photoelectric transducers of each of the CCD line sensors 28b, 28g, 28r, using a conventional moving average processing circuit.

The moving average signal outputted from the moving average processor 65 is supplied to the image processor 66 and processed thereby as desired.

Figure 8:
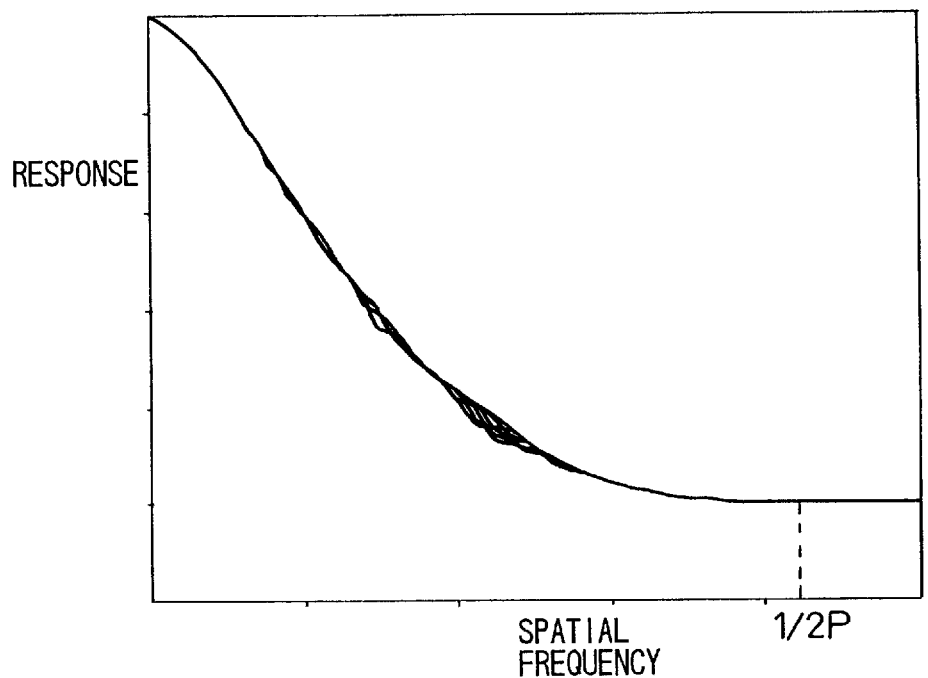
FIG. 8 is a graph showing the relationship between the spatial frequency and the response of the image reading apparatus.

The image signal thus produced by the image reading apparatus 10 has a resolution three times larger than that of an image signal which would otherwise be produced if an image were read by the CCD line sensors 28b, 28g, 28r fixed against oscillation. Since the resolution is three times larger, the spatial frequency that can be reproduced is also three times higher. Furthermore, as shown in FIG. 8, the response of the image reading apparatus 10 does not essentially vary depending on the phase of the image with respect to the photoelectric transducers of the CCD line sensors 28b, 28g, 28r. Moreover, because the image signal read by the CCD line sensors 28b, 28g, 28r is representative of one-dimensional data of each scanning line, each of the buffer memories 70A, 70B is not required to be a large-capacity memory, and hence is highly economical.

In the above embodiment, the CCD line sensors 28b, 28g, 28r are displaced by the ⅔ pixel interval. Gene rally, however, the piezoelectric element 32 may be controlled to vary "n" successively to 0, 1, . . . , 2k in the following equation:

$$M=2nP/(2k+1)$$

where M is the displacement from the origin of the CCD line sensors 28b, 28g, 28r in a direction along the CCD arrays, P the distance between the centers of two adjacent photoelectric transducers of the CCD line sensors 28b, 28g, 28r, and k is an integer of 1 or larger.

The image signals read by the CCD line sensors 28b, 28g, 28r which are displaced by the ⅔ pixel interval may be stored in the line buffers 70A and 70B at intervals of M/2 (at n=1), and image signals read by the first and last photoelectric transducers of the respective CCD line sensors, which may not be stored in the buffers 70A, 70B at intervals of M/2 (at n=1), may be respectively stored into the line buffers 70A, 70B at interval of M (at n=1) from the image signals read by adjacent photoelectric transducers and stored in the line buffers.

Figure 9:
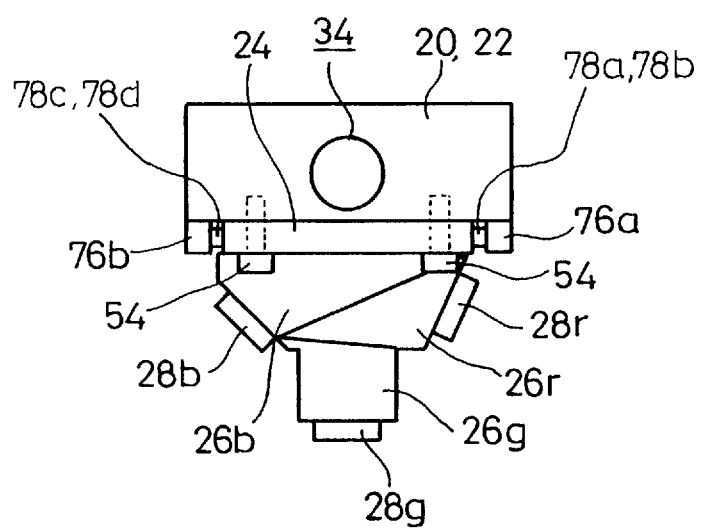
FIG. 9 is a side elevational view of a position adjusting mechanism of the transducer assembly of the image reading apparatus.
Figure 10:
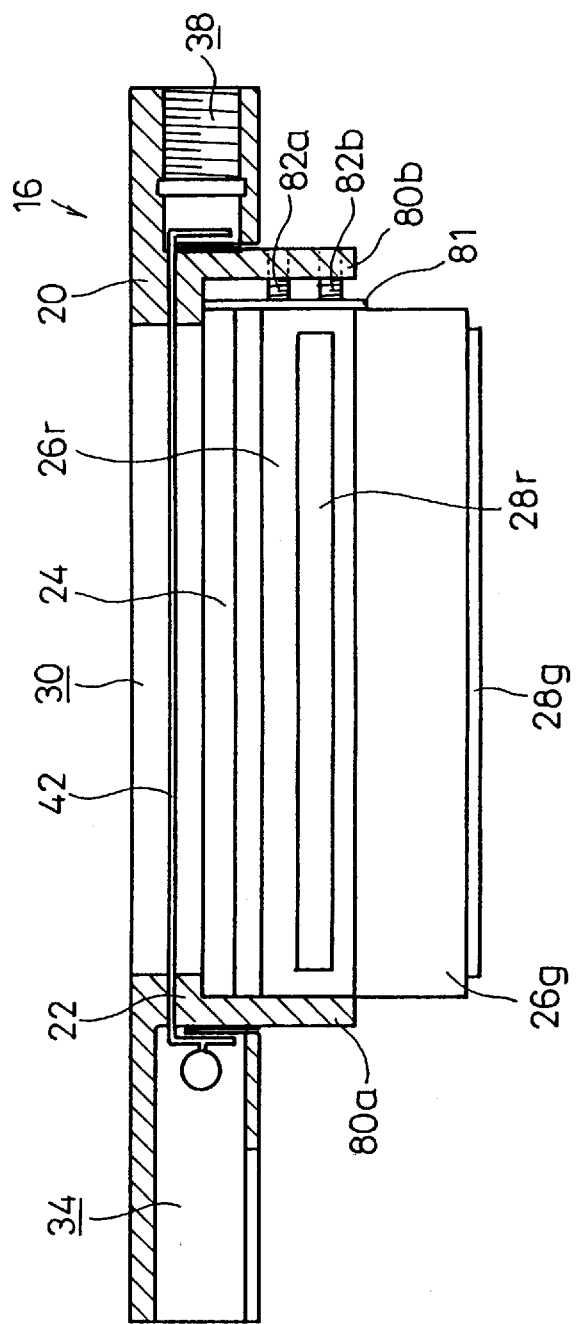
FIG. 10 is a cross-sectional view of the position adjusting mechanism of the transducer assembly of the image reading apparatus.

As shown in FIG. 3, the bracket 24 is coupled to the oscillator base 22 for angularly movement in a scanning plane about a pin 74, and may be adjusted to align the main scanning direction with the direction in which the oscillatory base 22 is displaced by the piezoelectric element 32, for thereby positioning the CCD line sensors 28b, 28g, 28r with respect to the oscillatory base 22. For such an adjustment, as shown in FIG. 9, ribs 76a, 76b extending along the main scanning direction may be mounted on the oscillatory base 22, and the bracket 24 may be positionally adjusted by adjustment screws 78a~78d threaded through the ribs 76a, 76b and having distal ends abutting against the bracket 24. Furthermore, as shown in FIG. 10, ribs 80a, 80b may be mounted on the opposite ends of the oscillatory base 22 in the main scanning direction, and the prisms 26b, 26g, 26r that have been adjusted through the bracket 24 by the adjustment screws 78a~78d may be securely held between the ribs 80a, 80b by screws 82a, 82b threaded through the rib 80b and having distal ends abutting against an abutment plate 81 held against an end of the prisms 26b, 26g, 26r.

Figure 11:
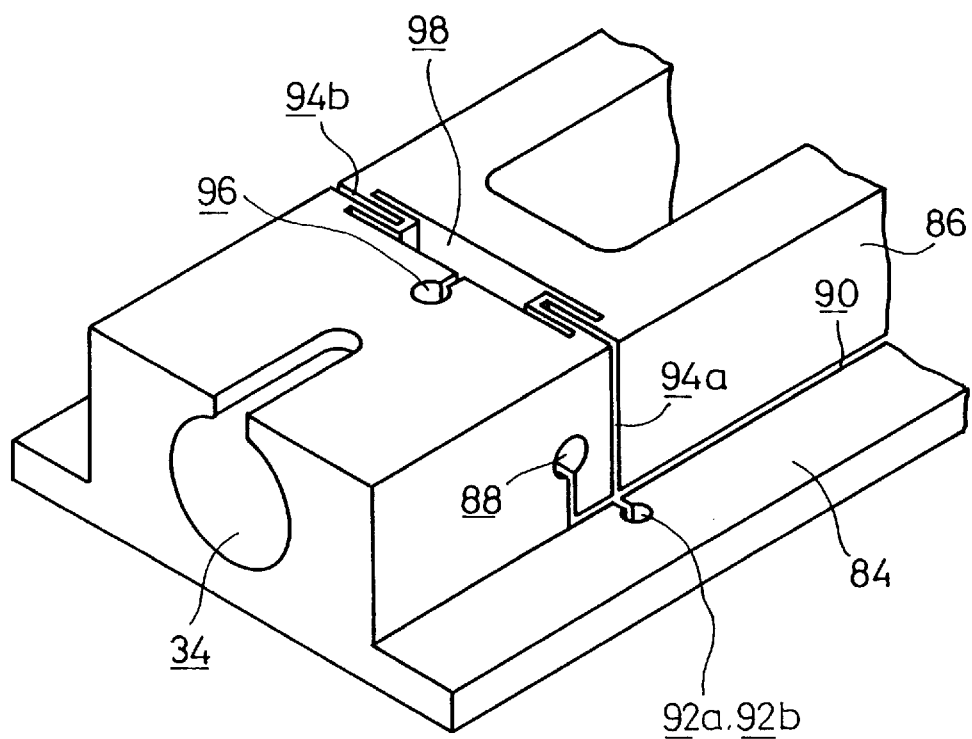
FIG. 11 is a fragmentary perspective view of another transducer assembly for use in the image reading apparatus.
Figure 12:
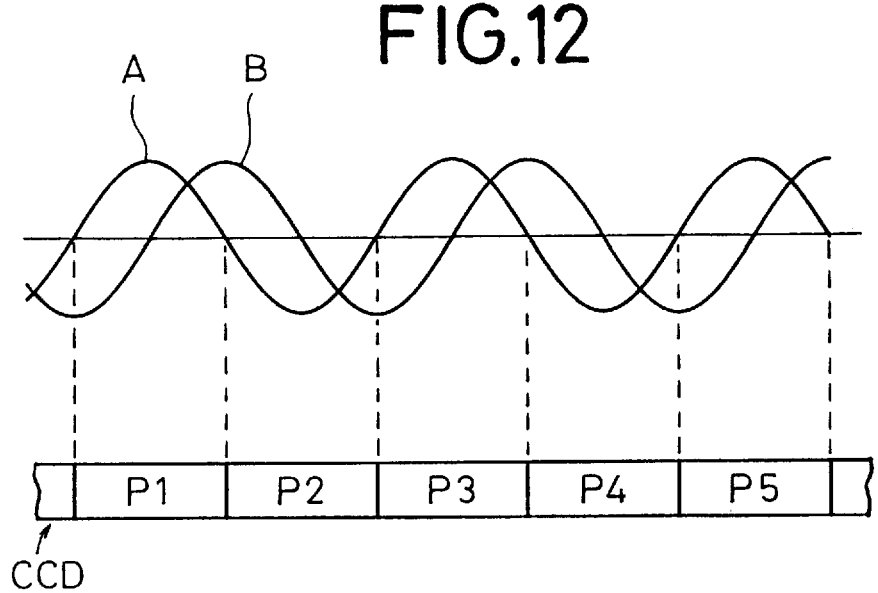
FIG. 12 is a diagram showing the relationship between the phases of images and photoelectric transducers of a CCD line sensor of a conventional image reading apparatus.
Figure 13:
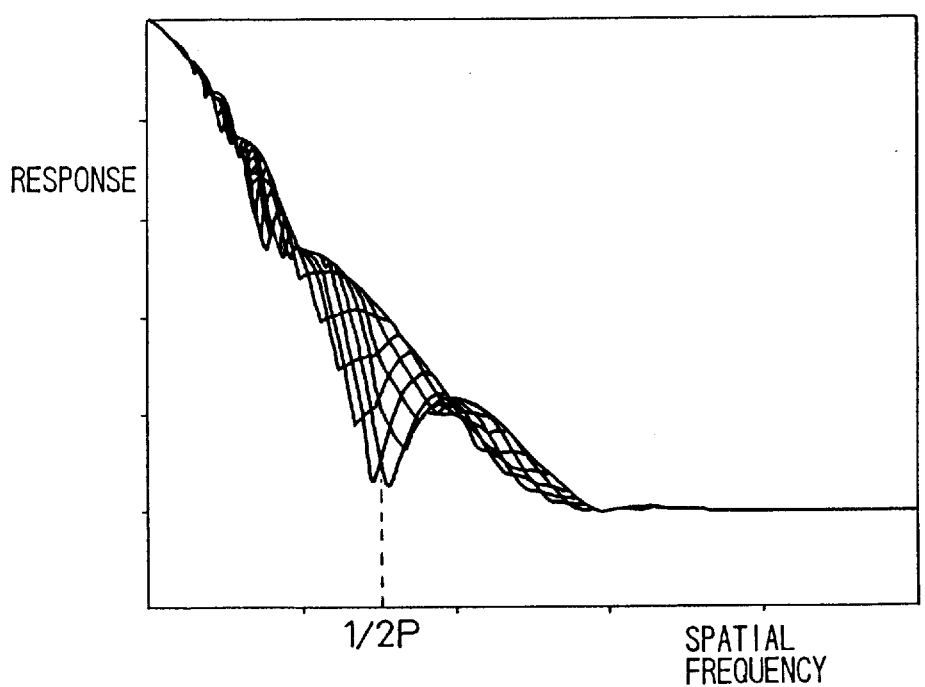
FIG. 13 is a graph showing the relationship between the spatial frequency and the response of the conventional image reading apparatus.

FIG. 11 shows another transducer assembly for use in the image reading apparatus. In FIG. 11, the transducer assembly comprises a support base 84 and an oscillatory base 86. The support base 84 and the oscillatory base 86 are integral with each other, but essentially separate from each other by various slits 90, 94a, 94b, 98 which are produced by a wire cutting electric discharge machine. The slit 90 is formed by a wire (not shown) inserted in and moving from a hole 88 in the main scanning direction, and then the slits 94a, 94b are formed by wires (not shown) inserted in and moving from respective holes 92a, 92b in the auxiliary scanning direction. Finally, the slit 98, which is of substantially an H shape, is formed by a wire (not shown) inserted in and moving from a hole 96.

As described above, the image reading apparatus 10 according to the present invention does not require a large memory capacity, can easily effect a moving average processing on odd- and even-numbered pixel signal from the line sensors, and can generate an image signal of desired resolution irrespective of the number of photoelectric transducers of the line sensors.

Although certain preferred embodiments of the present invention have been shown and described in detail, it should be understood that various changes and modifications may be made therein without departing from the scope of the appended claims.

What is claimed is:

1. An image reading apparatus comprising:

a line sensor comprising an array of photoelectric transducers including odd-numbered transducers producing odd-numbered pixel signals and even-numbered transducers producing even-numbered pixel signals, each of said pixel signals being produced at a respective location along a present scan line, said line sensor being movable in different positions along said present scan line including an original position and a plurality of subsequent positions;

displacing means for displacing said line sensor among said different positions;

memory means for storing the pixel signals produced by said photoelectric transducers at said different positions in a sequence, said sequence of pixel signals being ordered in said memory means according to said respective location for each of said pixel signals, wherein said sequence of pixel signals is such that said odd-numbered pixel signals are each adjacent to respective adjacent ones of said even-numbered pixel signals;

processing means for determining a moving average signal based on the stored pixel signals, wherein:

for an odd-numbered pixel signal, said moving average signal represents an average of said odd-numbered pixel signal and an adjacent even-numbered pixel signal, and for an even-numbered pixel signal, said moving average signal represents an average of said even-numbered pixel signal and an adjacent odd-numbered pixel signal; and pixel signal combining means for combining said moving average signals in a predetermined sequence and for storing in memory the combined pixel signals as a series of data;

wherein said different positions are 2k+1 in number and each spaced by an interval M expressed by:

$$M=2P/(2k+1)$$

where P is the distance between the centers of two adjacent ones of said photoelectric transducers and k is an integer of at least 1.

2. An image reading apparatus according to claim 1, wherein said displacing means comprises a piezoelectric element for displacing said line sensor.

3. An image reading apparatus according to claim 1, wherein said memory means comprises a line buffer for storing as many pixel signals as (2k+1) times the number of said photoelectric transducers.

4. An image reading apparatus according to claim 1, wherein said pixel signal combining means stores pixel signals produced by successive photoelectric transducers of said line sensor into said memory means at an interval of M/2 memory areas, when said line sensor is in said original position and in said successive positions displaced from said original position by n times the interval M (n is an integer of at least 1 and at most 2k), and pixel signals produced by the first and last photoelectric transducers of said line sensor, which may not be stored at said interval of M/2 memory areas, into said memory means, respectively, at an interval of M memory areas from pixel signals produced by adjacent photoelectric transducers and stored in said memory means.

5. An image reading apparatus comprising:

a line sensor composed of an array of photoelectric transducers for producing pixel signals;

memory means for storing the pixel signals produced by said photoelectric transducers;

processing means for determining a moving average of the pixel signals stored by said memory means;

displacing means for displacing said line sensor in a direction along said array of photoelectric transducers to successive positions each by an interval M expressed by;

$$M=2P/(2k+1)$$

where P is the distance between the centers of adjacent two of said photoelectric transducers and k is an integer of at least 1;

pixel signal combining means for combining the pixel signals produced by said photoelectric transducers when said line sensor is in an original position and displaced from said original position to said successive positions, in a predetermined sequence, and storing the combined pixel signals as a series of data in said memory means; and a transducer assembly which has an oscillatory base and a support base, said displacing means being attached to said support base, said line sensor being attached to said support base;

wherein said oscillatory base is connected to said support base by a thin-walled portion that is integral to said oscillatory base and integral to said support base so that each of said oscillatory base, said support base, and said thin-walled portion are integral with each other.

* * * * *